United States Patent [19]

Dupont

[11] Patent Number: 5,135,019
[45] Date of Patent: Aug. 4, 1992

[54] BALL VALVE

[75] Inventor: Pierre Dupont, Rambouillet, France

[73] Assignees: Den norske stats oljeselskap a.s., Stavanger, Norway; Mobil Oil Corporation, Fairfax, Va.

[21] Appl. No.: 684,941
[22] PCT Filed: Oct. 9, 1989
[86] PCT No.: PCT/NO89/00103
 § 371 Date: May 13, 1991
 § 102(e) Date: May 13, 1991
[87] PCT Pub. No.: WO90/04123
 PCT Pub. Date: Apr. 19, 1990

[30] Foreign Application Priority Data

Oct. 14, 1988 [NO] Norway ................... 884585

[51] Int. Cl.⁵ .............................. F16K 27/06
[52] U.S. Cl. ........................ 137/15; 137/315; 137/454.6
[58] Field of Search ......... 137/454.2, 454.5, 454.6, 137/315, 15; 251/312

[56] References Cited

U.S. PATENT DOCUMENTS 3,150,681 9/1964 Hansen et al. ............. 137/454.2
4,342,330 8/1982 Wieveg et al. ............. 137/315
4,587,990 5/1986 Pennell et al. ............. 137/454.2
4,606,368 8/1986 McCafferty ............. 137/454.2 X

FOREIGN PATENT DOCUMENTS

WO89/01583 2/1989 PCT Int'l Appl.
2176269 12/1986 United Kingdom.

Primary Examiner—Stephen M. Hepperle
Attorney, Agent, or Firm—Foley & Lardner

[57] ABSTRACT

A ball valve for use particularly in subsea hydrocarbon production systems including a valve body having a cavity of generally conical shape and communicating with inlet and outlet ports having a common axis. An insert assembly is provided with a valve ball, two ports corresponding to the inlet and outlet ports, respectively, and associated seat means. The insert assembly has a generally conical shape which is generally the same as that of the cavity and being adapted to be housed therein and to be retrieved therefrom. The insert assembly is composed of two parts joined together generally along a dividing plane. Connector means are provided for releasably fixing the insert assembly in the cavity, and actuator means are provided for rotating the valve ball about its axis between a closed and an open position with respect to said ports. The dividing plane between the two parts of the insert assembly is normal to the rotational axis of the valve ball and substantially coincides with the common axis of the inlet and outlet ports.

8 Claims, 5 Drawing Sheets

BALL VALVE

BACKGROUND OF THE INVENTION

This invention relates to a ball valve for use particularly in subsea hydrocarbon production systems. Although the valve is designed for subsea use, it may also be utilized in other harsh environment applications where a top entry valve is selected to facilitate maintenance operations. The invention also comprises a method for manufacturing an insert assembly for this new ball valve.

In most cases flowlines from subsea hydrocarbon production systems need to include an isolation valve to separate sections of flowlines allowing maintenance of section equipment and emergency shutdown services of flowlines upstream of the process facilities to prevent hazardous pollution/discharges. A primary use of the present ball valve is as such an isolation valve. For use in water depths beyond access of divers the valve insert, which contains all active parts, should be retrievable to the surface for repair by using a remotely operated tool (ROT).

Thus, more particularly the invention is directed to the kind of ball valve comprising a valve body having a cavity of generally conical shape and communicating with inlet and outlet ports having a common axis, an insert assembly provided with a valve ball, two ports corresponding to said inlet and outlet ports, respectively, and associated seat means, the insert assembly has a generally conical shape as cavity and, is adapted to be housed therein and to be retrieved therefrom. The insert assembly is composed of two parts joined together generally along a dividing plane, connector means for releasably fixing said insert assembly in said cavity, and actuator means for rotating the valve ball about its axis between a closed and an open position with respect to the ports.

From U.S. Pat. No. 4,606,368 there is previously known a ball valve for the above purpose, and incorporating features corresponding in part to what is recited immediately above.

SUMMARY OF THE INVENTION

In the subsea applications mentioned involving the rough conditions usually found in offshore hydrocarbon production, it is extremely important that all components, such as valves, be very reliable and also able to be retrieved to the surface in a simple and secure manner. At the same time the cost of manufacturing and installing such components must not be prohibitive. The present invention is directed to an improved ball valve of the type referred to above, as well as an associated method for manufacturing the insert assembly for the ball valve, making it possible, inter alia, to obtain a better machining with increased accuracy without undue manufacturing costs.

This is obtained in a ball valve as recited above, in which the dividing plane between the two parts of the insert assembly is normal to the rotational axis of the valve ball and substantially coincides with the common axis of the inlet and outlet ports.

One particular advantage of this solution consists in the provision of seals surrounding each of the two ports in the insert assembly, which seals can be mounted on respective outer ends of tubular sleeve members defining the ports, and being fixed between the two parts of the insert assembly. Preferably, the sealing against the valve ball is also provided for by elements associated with these tubular sleeve members.

BRIEF DESCRIPTION OF THE DRAWINGS

Other related features and advantages of this invention will be explained more closely below with reference to the drawings, in which.

DETAILED DESCRIPTION OF THE PREFERRED EMBODIMENT

Figure 1:
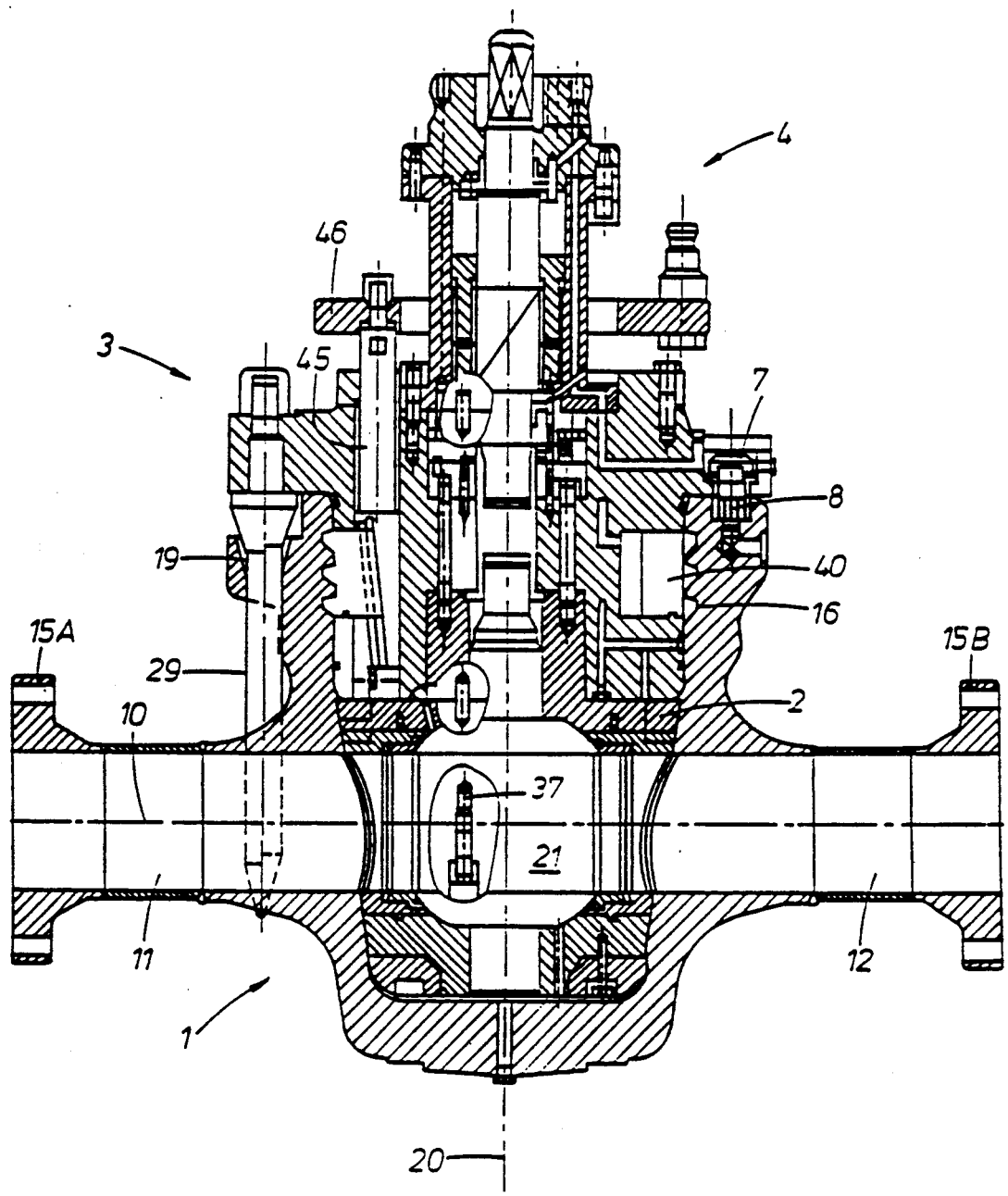
FIG. 1 shows as an example and somewhat simplified a complete assembled ball valve according to the invention, in longitudinal section and in an open position, FIG. 2A show a retrievable assembly (FIG. 2A) as and 2B retracted from the valve body (FIG. 2B), the main parts or components of the valve being the same as in FIG. 1.

The ball valve shown as an example in the drawings can be considered to represent a 12" retrievable insert flowline valve for use at a water depth of, for example 400 m. The valve design can, however, be used for various dimensions as well as various water depths. The design is such that all active or movable parts thereof may be retrieved to the surface for repair, and this can be done by using a remotely operated tool unit (ROT) in a simple manner, that is in one operational step only. This, inter alia, is made possible by connector means adapted to lock and unlock in relation to the valve body by a simple push-pull system. This system however, does not constitute a part of the present invention. Reference is made to co-pending patent application - Sak 4 - Connector which is U.S. patent application Ser. No. 07/684,943.

Figure 2A:
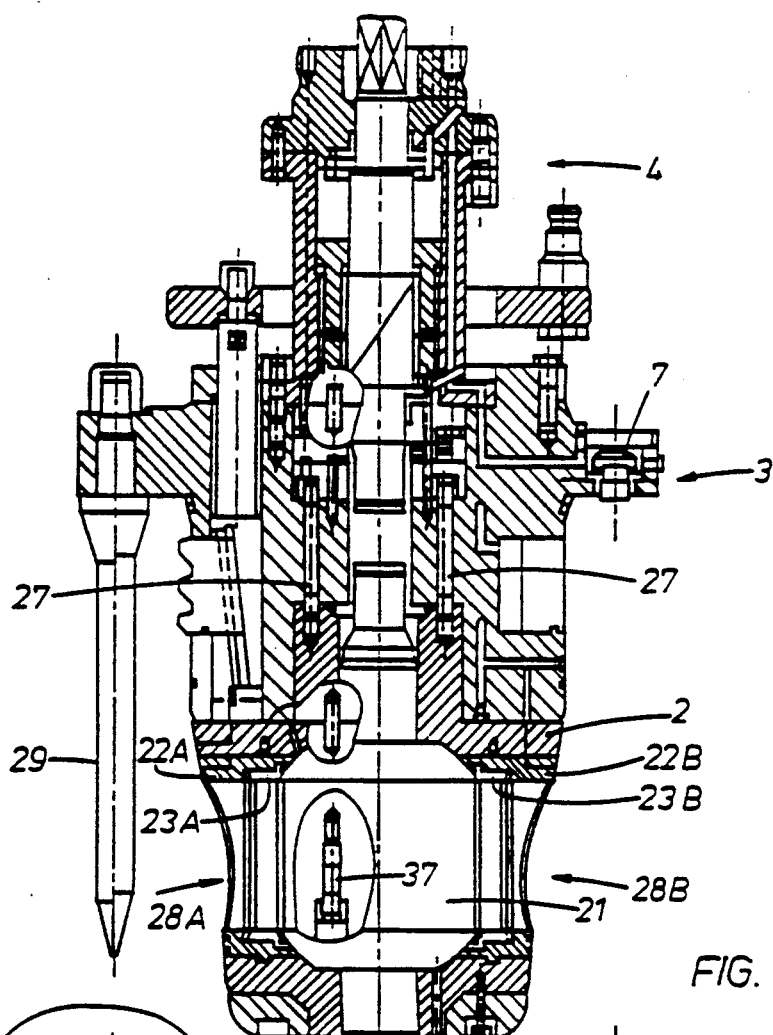
Figure 2B:
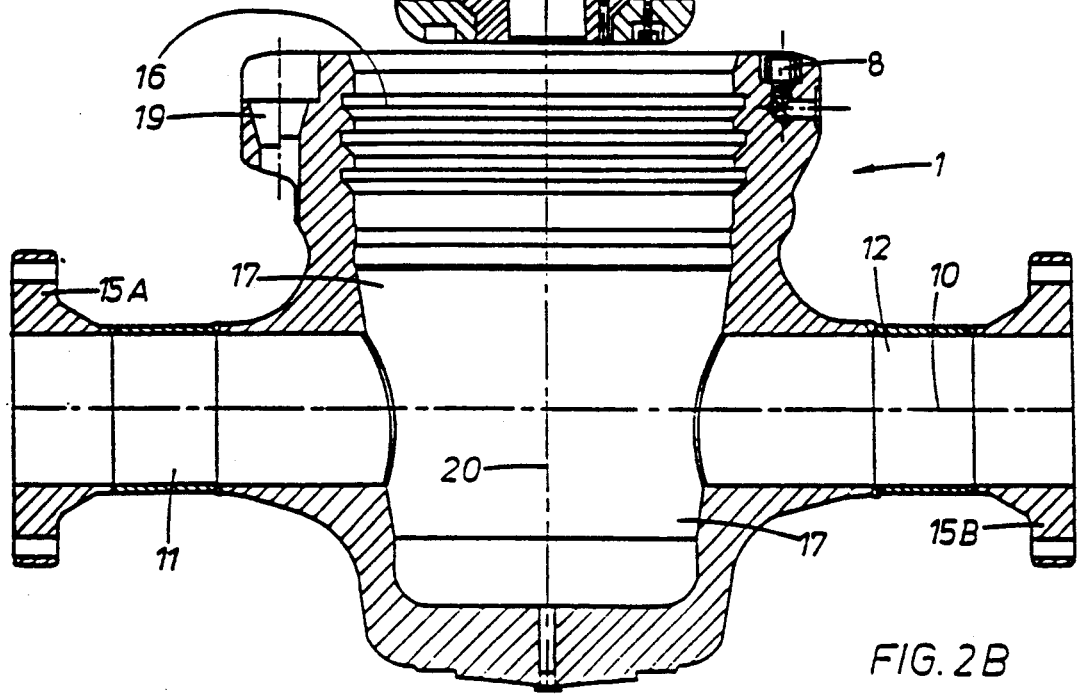

Referring in particular to FIGS. 1, 2A and 2B it is seen that this valve is composed of four main components or assemblies, these being a valve body 1 (FIG. 2B), an insert assembly 2, connector means 3 and an actuator 4. The latter three components constitute a retrievable unit as shown in FIG. 2A.

The valve body 1 has the following functional elements or areas:

Flanges 15A and 15B or other end pieces for connection to upstream and downstream flowlines in which the valve is to be installed.

Guide pin holes 19 for cooperation with a mating guide pin 29 on the retrievable unit shown in FIG. 2A. These guide means are of rather common design in offshore subsea installations.

Figure 3:
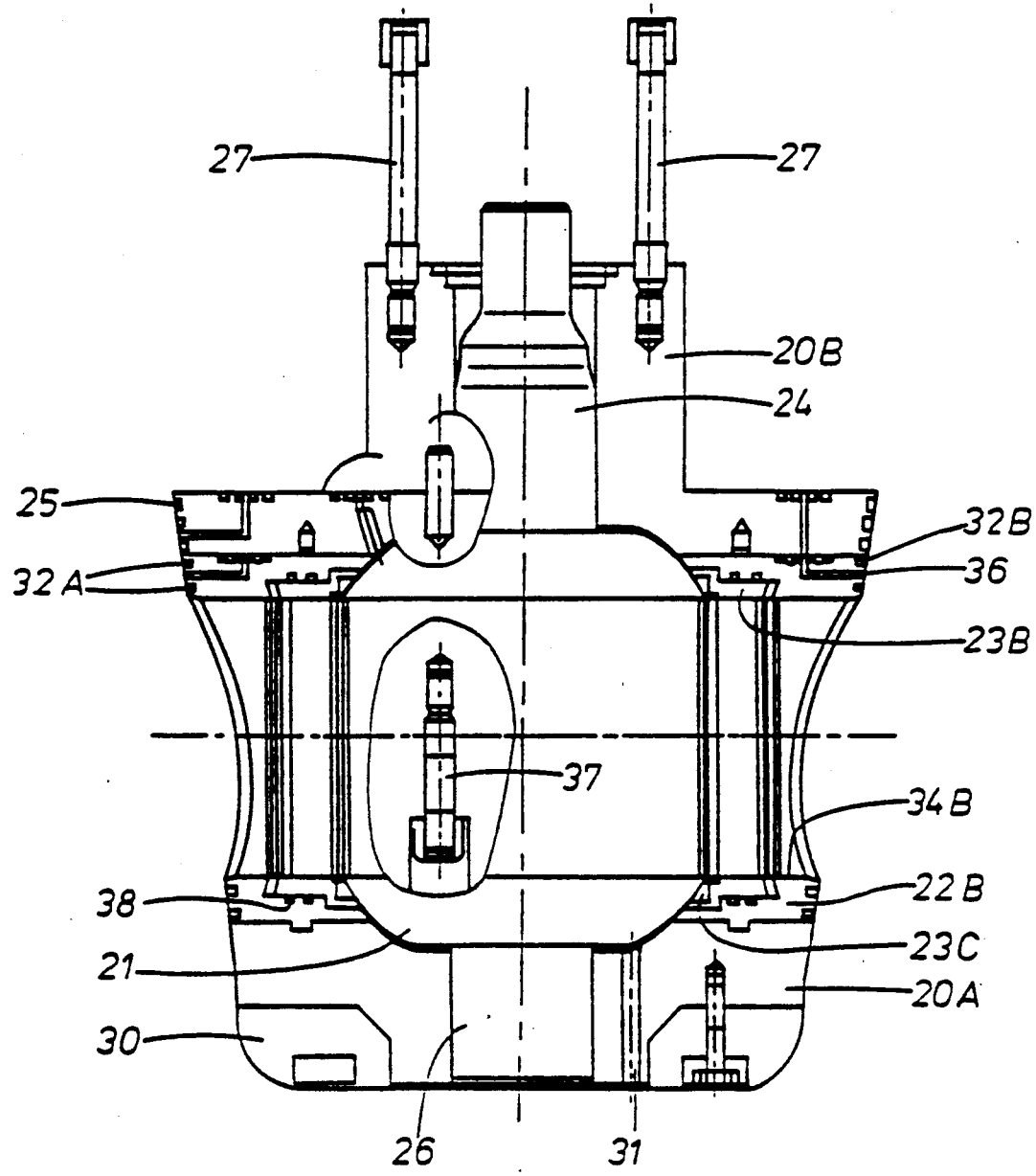
FIG. 3 shows somewhat more in detail the actual insert assembly which constitutes a crucial component of the valve of FIG. 1 and 2.

A conical area or cavity 17 shaped to match and receive the correspondingly conical insert assembly 2 as shown in more detail in FIG. 3.

A number of circular grooves 16, designed for cooperation with connector means mentioned above, for locking the complete retrievable unit including the insert assembly 2, onto the valve body 1.

Electric or hydraulic connectors 7 and 8 for establishing connections between the valve body 1 and the retrievable unit.

Figure 4:
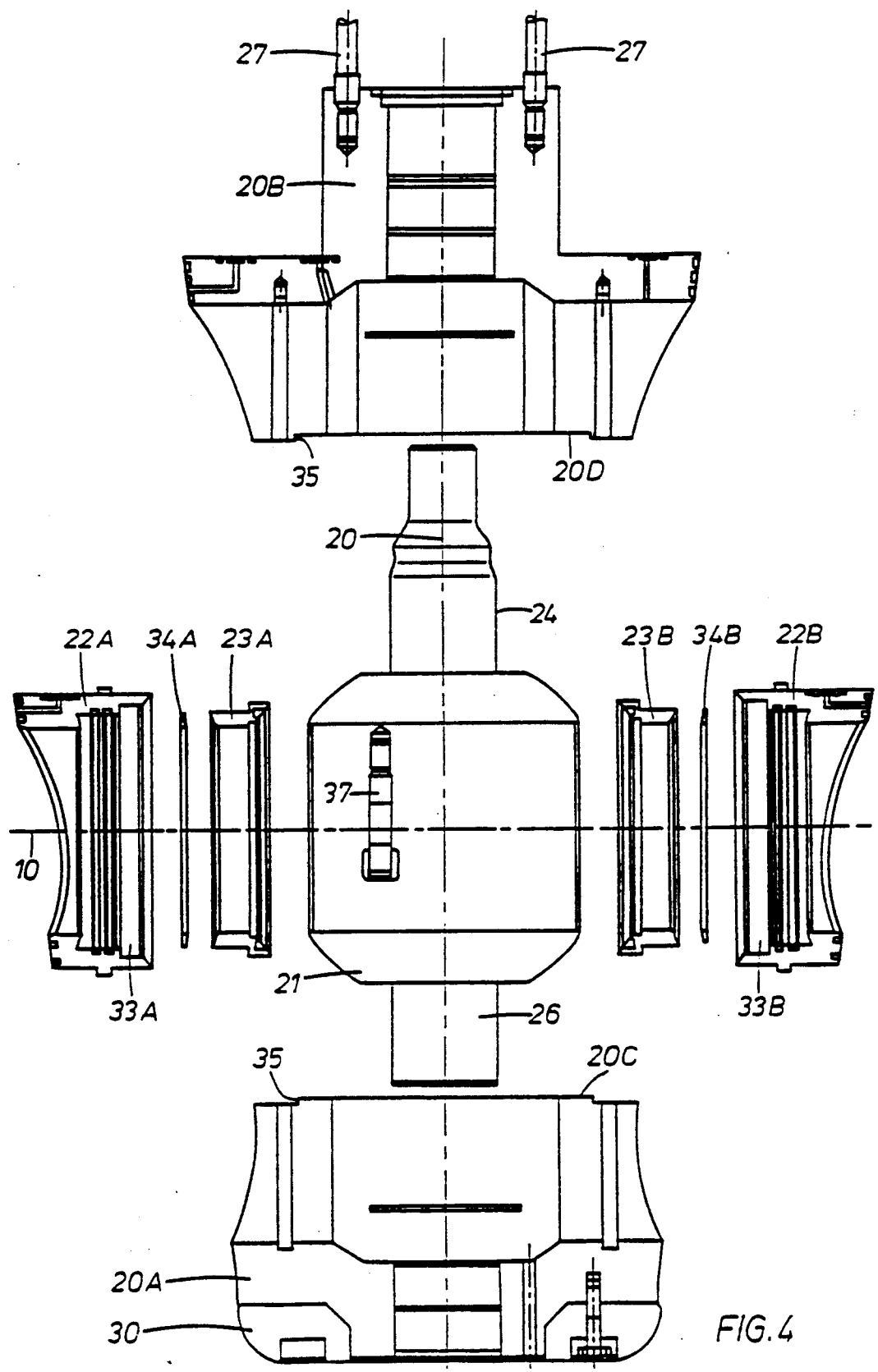
FIG. 4 shows the insert assembly of FIG. 3 in an exploded view, to better illustrate the various parts and elements making up the insert assembly.

The insert assembly 2 constitutes the lower portion of the retrievable valve unit (FIG. 2A), and is particularly illustrated in FIGS. 3 and 4. This insert has a generally conical shape adapted to interface with the conical cavity 17 in the valve body 1. As seen particularly in FIG. 4 the actual insert is divided into two parts 20A and 20B bolted together generally along an axis 10 corresponding to the common axis of the inlet and outlet ports 11 and 12 respectively, of the valve body 1 (see FIG. 1). These two insert parts 20A and 20B form the housing for a valve ball 21, seat lodgements in the form of tubular sleeve members 22A, 22B and a seat assembly with seat rings 23A, 23B for sealing against the valve ball 21, with an actual seal seated in ring 23B indicated at 23C in FIG. 3. As will be seen from FIG. 1 and 2A, ports 28A and 28B, defined by the sleeve members 22A, 22B, are co-axial with the inlet and outlet ports 11,12 and preferably have the same flow cross sectional area as these. Also, the bore through the valve ball 21 should preferably be correspondingly positioned and dimensioned, as is usual in ball valves.

Opening and closing of the valve is effected by rotation of the valve ball 21 about its axis 20 by means of the actuator 4.

The upper part 20B of the insert contains a bushing for the valve ball stem 24 and seals 25 preventing leakage to the sea when the valve is operated. Between these seals there is provided a test port so that they can be tested from an ROT during installation. The upper part 20B of the the insert is also equipped with stud bolts 27 for the mechanical connection between the insert assembly 2 and the connector assembly 3. The lower part 20A of the insert 2 contains a bushing for a valve ball trunnion 26. A buffer 30 is bolted to the lower part 20A to avoid damage of the valve body 1 during installation of the retrievable valve insert unit (RVI). The lower insert part also includes a bore 31 for fluid bleed-off of the valve from the ROT and to prevent hydraulic lock in the lower part of the valve body during RVI installation.

Interior surfaces of the insert parts 20A, 20B are machined to receive the valve ball stems 24, 26, the ball 21 itself and the sleeve members 22A, 22B. As mentioned, these members are of tubular shape and are machined internally to meet on one side, the seat holder ring 23A, 23B, and on the opposite side, the valve body 1. More specifically the inner part of each sleeve member has a recess 33A, 33B for housing a seat ring 23A, 23B respectively. Sealing between the insert and the valve body is assured by two seals 32A, 32B moulded in grooves machined in the outer ends of the sleeve members 22A, 22B. As an alternative, seals 32A,B can be lip seals or other types of seals mounted by other means than moulding. Between these seals (both upstream and downstream) there is provided a test port 36 which allows the seals to be be tested from the ROT during RVI installation. The ball seat rings 23A, 23B are spring loaded, e.g. via spring elements 34A, 34B, for low pressure sealing and automatic pressure relief in the cavity 17 when the valve is closed. Two seals 38 ensure the leaktightness between the seat rings 23A, 23B and the sleeve members 22A, 22B. From the above it is seen that the valve ball 21 is trunnion mounted, of monobloc design, and pressure-balanced. Special tooling is necessary for the installation of the ball, the sleeve members and the seat rings inside the insert assembly.

Reference is now made to FIG. 4 which is an exploded view showing the vital parts of the actual insert separated from each other. Specifically the lower insert part 20A and the upper insert part 20B are shown with a main dividing plane or surface denoted 20C and 20D respectively. A small circular step 35 is machined on both parts for axial alignment when the parts are joined. As already mentioned, surfaces 20C and 20D engage each other in the assembled condition of the insert, define a dividing plane coinciding with the axis 10 of the various ports through the valve. However, it is not strictly necessary that the dividing plane corresponds exactly with the axis 10.

With the general rotational symmetry of both insert parts 20A and 20B about the vertical axis 20 in FIG. 4, this latter axis being the axis of rotation of the valve ball 21, it is seen that most of the surfaces thereof requiring machining can be machined in a simple manner without much waste of material. In practice, the manufacturing of these two insert parts starts with a casting or forging step, preferably using a high grade steel quality. Then both insert parts 20A and 20B are machined separately as mentioned, including an exact machining of surfaces 20C and 20D with steps 35 in preparation for the joining of these parts. Then the two insert parts with the sleeve members are assembled, using bolts 37 to be described more in detail below, and these assembled parts are subjected to the finishing machining step so as to obtain the final shape and dimensions for the complete insert assembly to be inserted into the valve body 1. This final machining step plays an important role in finishing the outer end surfaces of the sleeve members 22A and 22B, so as to be flush with the adjacent conical surfaces of the insert. This accurate machining of the assembled parts makes it possible to obtain very effective sealing, such as with the seals 32A and 32B mounted in the outer ends of the sleeve members.

In connection with the above it will be understood that the seals 32A and 32B, as well as other seals provided in the complete insert assembly, may be subject to wear and therefore from time to time will need to be maintained. Because of the specific manner of mounting the tubular sleeve members 22A and 22B, including the seat holders or rings 23A and 23B, such maintenance or exchange of these important seals, may be done in a very practical manner without requiring too much time and labour. This, however, does not exclude the possibility of using lip seals for seals 32A,B, making these seals separately installable and removable.

Figure 5:
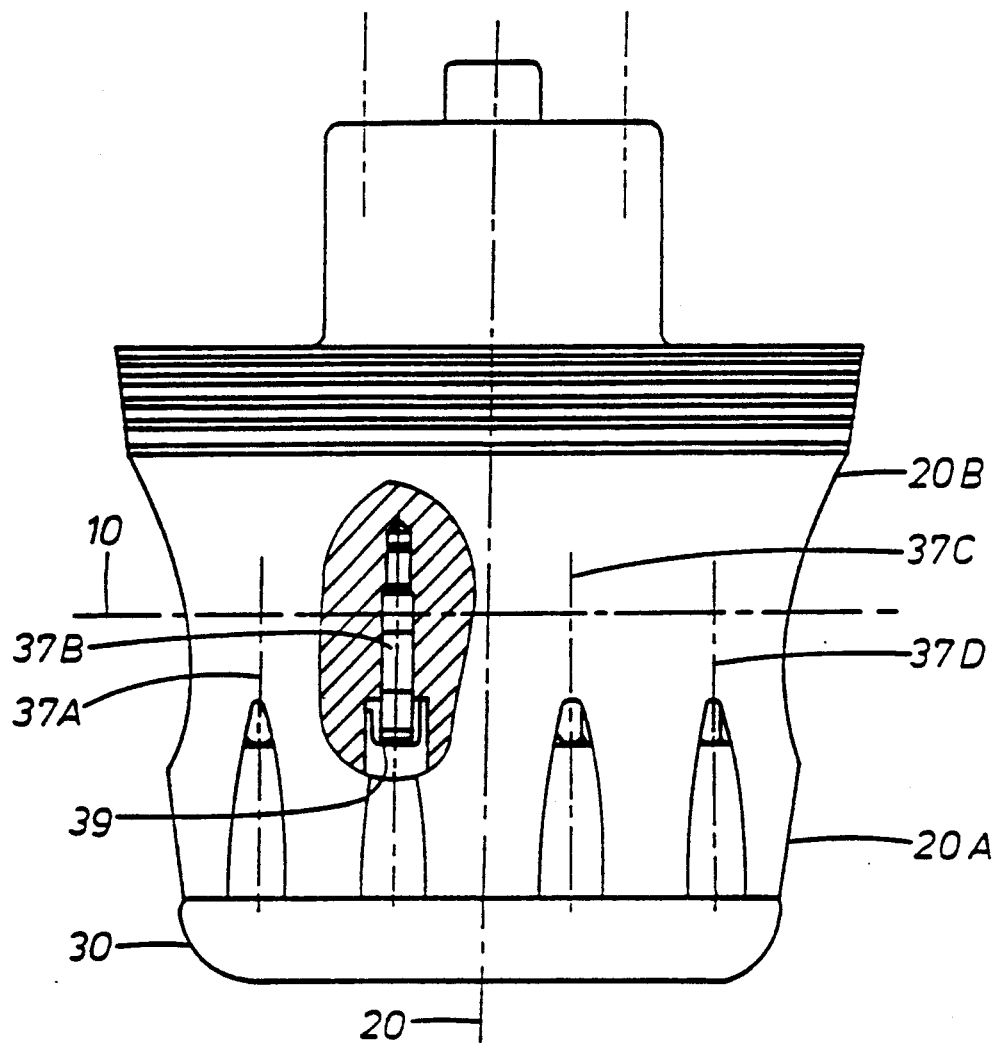
FIG. 5 shows the insert assembly in elevation, in particular illustrating the bolts joining the two parts of the insert assembly.

Although in FIG. 1, 2A, 3 and 4 the manner of joining the two insert parts 20A and 20B has been indicated in the form of a bolt 37 in a cut-out section, a more complete picture of this bolting is obtained from FIG. 5. As will be seen from this figure there are provided a number of bolts 37A,B,C and D along the periphery of the insert, a corresponding number of bolts being used on the other side of the insert. Obviously the number of such bolts may be different from what is shown in FIG. 5. As in FIG. 1–4 a cut-out cross section shows the details of bolt 37B with a nut 39 securing parts 20A and 20B and thereby the complete insert assembly in the form shown for example in FIG. 3.

The design of the valve insert as described above, as well as the method of manufacturing the same, are based on the particular form of two-part conical insert which has a very critical function in such valves, allowing for rotational machining only because of the dividing plane substantially along the axis of the valve bore.

Turning now again to FIG. 1 and 2, the connector and actuator assemblies shall be briefly explained. The connector assembly 3 is centered and connected to the insert assembly 2 by means of bolts 27. Necessary seals are provided between these two assemblies as well as against the valve body 1. The connector assembly 3 serves the important function of locking the complete retrievable unit onto the valve body 1 in a releasable manner, this being effected by means of a remotely operated tool unit (ROT). The connector mechanism is situated in a deep annular groove in the connector assembly, with locking pieces or dogs 40 having ribs shaped to fit into grooves 16 in the valve body 1. These locking pieces can be moved laterally by vertical movement of a number of drive rods 45, the vertical movement of these rods being transformed into horizontal movement of the locking pieces 40 by cooperating inclined surfaces at the lower ends of the rod and at the inner sides of the locking pieces respectively. The upper ends of the rods 45 are attached to a common ring 46 wich permits a synchronized movement of all the locking pieces or dogs 40. The connection between the valve body 1 and the complete, retrievable unit with assemblies 2, 3 and 4 is established by applying a pushing force, whereas disconnection is obtained by pulling. The pushing and pulling forces respectively will be exerted by an ROT as already mentioned.

The actuator assembly 4 is the uppermost part of the RVI. The actuator may be of a well known design and is based upon a double-acting jack for rotating the valve stem 24. A coupling piece links the stem 24 to the shaft of the actuator. A valve position indicator may be mounted around the upper part of this coupling piece. When the complete retrievable unit is lowered for inserting the actual insert assembly 2 into the valve body 1, guide pins 29 around the periphery of the connector assembly 3, cooperate with corresponding guide holes 19 on the valve body. Thus progressive positioning of the RVI into the valve body is ensured so as to avoid damage to any of the parts. In this connection it should be noted that the buffer 30 at the bottom of the insert is very useful as an extra security measure.

I claim:

1. A ball valve comprising:
    a valve body having inlet and outlet ports having a common axis, and having a cavity of generally conical shape formed therein;
    an insert assembly which has a generally conical shape generally matching the shape of said cavity and which can be housed in said cavity, which is provided with a valve ball, which is composed of two parts which are joined together generally along a dividing plane, and which has two ports corresponding to said inlet and outlet ports, said insert assembly having actuator means for rotating said valve ball about an axis of rotation between a closed position and an open position with respect to said two ports, and seat means for connecting said two ports to said inlet and outlet ports, respectively; and
    connector means for releasably fixing said insert assembly in said cavity;
    wherein said dividing plane between said two parts of said insert assembly is normal to said rotational axis of said valve ball and substantially coincides with said common axis of said inlet and outlet ports.

2. A ball valve according to claim 1, wherein the surface of each of said two parts of said insert assembly defining said dividing plane is provided with at least one circular step for allowing axial alignment of said two parts when said two parts are joined to one another.

3. The ball valve according to claim 1, wherein said two ports are defined by tubular sleeve members, and further comprising seals which surround each of said two ports and which seal and said two ports in said cavity of said valve body, said seals being mounted in said tubular sleeve members and being fixed between said two parts of said insert assembly.

4. The ball valve according to claim 3, further comprising replaceable seat rings which are sealable against said valve ball, each of said seat rings being held in an annular recess at an inner part of a respective one of said tubular sleeve members.

5. The ball valve according to claim 4, further comprising a spring element which is provided in each of said annular recesses and which biases the respective one of said seat rings towards said valve ball.

6. A method for manufacturing an insert assembly for a ball valve, said insert assembly having a valve ball which is rotatable about an axis of rotation, and actuator means for rotating said valve ball about said axis of rotation between a closed position and an open position with respect to two ports of said insert assembly, said method comprising the steps of:
    forming two parts of said insert by one of casting and forging, each of said two parts having one of said ports formed therein; then
    preliminarily machining both of said two parts separately, including finished machining the surfaces of both of said two parts along a dividing plane which is normal to said axis of rotation of said valve ball; then
    joining said two parts along said dividing plane via means for fixedly joining said two parts to one another; and then
    machining said joined part to a final shape and dimension comprising a generally conical shape which is dimensioned for insertion into a generally conical cavity of a valve body and for releasable connection to said valve body via connectors, said valve body having inlet and outlet ports which correspond to said two ports of said insert assembly and which have a common axis which substantially coincides with said dividing plane.

7. The method according to claim 6, wherein said step of forming said two parts of said insert assembly comprises forming parts having tubular sleeve members defining said two ports, said step of joining said two parts comprises joining said two parts with said tubular sleeve members mounted between said two parts, and said step of machining said two parts to said final shape and dimension comprises machining outer ends of said tubular sleeve members so that said outer ends are flush with adjacent surfaces of said inset assembly.

8. The method according to claim 7, further comprising
    disassembling said insert assembly after said joined parts are machined to their final shape and dimension, then
    machining seal grooves into said outer ends of said tubular sleeve members and mounting seals in said grooves, and then
    finally assembling said insert assembly including said valve ball, said insert parts, said tubular sleeve members, said seals, and seat rings, using said joining means.

* * * * *